United States Patent
Plusquellic (10) Patent No.: US 11,863,304 B2
(45) Date of Patent: Jan. 2, 2024

(54) SYSTEM AND METHODS DIRECTED TO SIDE-CHANNEL POWER RESISTANCE FOR ENCRYPTION ALGORITHMS USING DYNAMIC PARTIAL RECONFIGURATION

(71) Applicant: STC.UNM, Albuquerque, NM (US)

(72) Inventor: James Plusquellic, Albuquerque, NM (US)

(73) Assignee: UNM RAINFOREST INNOVATIONS, Albuquerque, NM (US)

( * ) Notice: Subject to any disclaimer, the term of this patent is extended or adjusted under 35 U.S.C. 154(b) by 0 days.

(21) Appl. No.: 16/759,729

(22) PCT Filed: Oct. 30, 2018

(86) PCT No.: PCT/US2018/058208
§ 371 (c)(1),
(2) Date: Apr. 27, 2020

(87) PCT Pub. No.: WO2019/089590
PCT Pub. Date: May 9, 2019

(65) Prior Publication Data
US 2020/0313847 A1 Oct. 1, 2020

Related U.S. Application Data

(60) Provisional application No. 62/579,731, filed on Oct. 31, 2017.

(51) Int. Cl.
*H04L 9/00* (2022.01)
*H04L 9/06* (2006.01)
*H04L 9/16* (2006.01)

(52) U.S. Cl.
CPC ............ *H04L 9/003* (2013.01); *H04L 9/0631* (2013.01); *H04L 9/16* (2013.01); *H04L 2209/12* (2013.01)

(58) Field of Classification Search
CPC ......... H04L 9/003; H04L 9/0631; H04L 9/16; H04L 2209/12; H04L 2209/16; H04L 2209/08; H04L 9/28
See application file for complete search history.

(56) References Cited

U.S. PATENT DOCUMENTS 6,553,510 B1 * 4/2003 Pekny .................... G11C 29/78
714/710
6,839,847 B1 * 1/2005 Ohki .................... G06Q 20/341
713/194

(Continued)

FOREIGN PATENT DOCUMENTS

CN 102185692 9/2011
CN 103 297 223 B 6/2017

OTHER PUBLICATIONS

International Search Report and the Written Opinion of the International Searching Authority, dated Jan. 31, 2019.

(Continued)

*Primary Examiner* — Abu S Sholeman
(74) *Attorney, Agent, or Firm* — Valauskas Corder LLC (57) ABSTRACT

A side-channel attack countermeasure that leverages implementation diversity and dynamic partial reconfiguration as mechanisms to reduce correlation in the power traces measured during a differential power analysis (DPA) attack. The technique changes the underlying hardware implementation of any encryption algorithm using dynamic partial reconfiguration (DPR) to resist side-channel-based attacks.

8 Claims, 8 Drawing Sheets

(56) References Cited

U.S. PATENT DOCUMENTS

| | | | | |
|---|---|---|---|---|
| 7,500,112 B1* | 3/2009 | Wille | H04L 9/003 | 713/194 |
| 8,583,944 B1* | 11/2013 | Trimberger | G06F 11/3058 | 713/194 |
| 9,418,231 B2 | 8/2016 | Kruglick | | |
| 10,333,708 B1* | 6/2019 | Diamant | H04L 9/0631 | |
| 2003/0068038 A1* | 4/2003 | Hanounik | H04L 9/0625 | 380/37 |
| 2003/0091185 A1* | 5/2003 | Swindlehurst | H04L 9/065 | 380/44 |
| 2005/0259814 A1* | 11/2005 | Gebotys | H04L 9/0618 | 380/28 |
| 2006/0140398 A1* | 6/2006 | Avanzi | G06F 7/725 | 380/30 |
| 2007/0098153 A1* | 5/2007 | Nishikawa | H04L 9/0631 | 380/30 |
| 2007/0101156 A1* | 5/2007 | Novoa | G06F 21/575 | 713/190 |
| 2007/0150756 A1* | 6/2007 | Kudelski | H04L 63/0428 | 713/194 |
| 2008/0192928 A1* | 8/2008 | Yu | G06F 21/85 | 711/E12.098 |
| 2008/0285743 A1* | 11/2008 | Yokota | H04L 9/0631 | 380/28 |
| 2009/0138710 A1* | 5/2009 | Minematsu | H04L 9/0631 | 713/170 |
| 2010/0082943 A1* | 4/2010 | Yamamoto | G06F 15/7867 | 712/43 |
| 2011/0154012 A1* | 6/2011 | Kusmanoff | G06F 7/5324 | 713/100 |
| 2012/0284513 A1* | 11/2012 | Yerli | H04L 67/38 | 713/168 |
| 2015/0171870 A1 | 6/2015 | Parker | | |
| 2015/0254180 A1* | 9/2015 | Shi | G06F 30/34 | 711/122 |
| 2016/0072779 A1* | 3/2016 | Medwed | H04L 9/0618 | 713/171 |
| 2016/0140340 A1* | 5/2016 | Walters | G09C 1/00 | 726/22 |
| 2018/0114038 A1* | 4/2018 | Wang | G06K 19/07363 | |
| 2018/0183569 A1* | 6/2018 | Zhang | G09C 1/00 | |

OTHER PUBLICATIONS

Bete N. G. et al: Implementation Diversity and Dynamic Partial Reconfiguration for Impeding Differential Power Analysis Attacks on FPGAs, HOST Symposium May 5, 2017 (May 5, 2017) URL:http://www.hostsymposium.org/host2017/ hwdemo/HOST 2017 hwdemo 25.pdf.

* cited by examiner

SYSTEM AND METHODS DIRECTED TO SIDE-CHANNEL POWER RESISTANCE FOR ENCRYPTION ALGORITHMS USING DYNAMIC PARTIAL RECONFIGURATION

CROSS-REFERENCE TO RELATED APPLICATIONS

This application claims the benefit of U.S. Provisional Application 62/578,731 filed Oct. 30, 2017, incorporated herein by reference.

FIELD OF THE INVENTION

The invention relates generally to field programmable gate arrays (FPGA). More specifically, the invention relates to changing the implementation characteristics of components or sub-components of any encryption algorithm using dynamic partial reconfiguration (DPR) to resist side-channel-based attacks.

BACKGROUND OF THE INVENTION

Security and trust have become critically important for a wide range of existing and emerging microelectronic systems including those embedded in aerospace and defense, Industrial Control Systems (ICS) and Supervisory Control and Data Acquisition (SCADA) environments, automotive and autonomous vehicles, data centers, communications and medical healthcare devices. The vulnerability of these systems is increasing with the proliferation of internet-enabled connectivity and unsupervised in-field deployment.

Authentication and encryption are heavily used for ensuring data integrity and privacy of communications between communicating devices. The security of the system depends on the key being securely stored and remaining private within the chip when encryption and decryption is taking place. Unfortunately, these assumptions are no longer valid, and in fact, adversaries can apply invasive and semi-invasive techniques, generally referred to as side-channel techniques, to extract information from chips that was traditionally considered private.

A wide variety of techniques have emerged that measure analog signals as a means of extracting internal secrets from the chip. The term side-channel refers to techniques developed for this purpose, and include methods that analyze leakage current, dynamic power (transient currents) and electromagnetic emissions. Used alone or in combination with fault injection techniques, where adversaries purposefully introduce clock and power glitches, such techniques can allow adversaries to steal secret keys and other private information in hours or days, effectively defeating the algorithmic protections engineered into the security algorithms.

A previous known method uses countermeasures to increase resistance, in particular against fault attacks, by randomly changing the physical location of functional blocks on the chip area at run-time through DPR. Another previous known method uses generic and resource-efficient countermeasures for on-chip noise generation, random-data processing delays and S-box scrambling using dual-ported block memories. Yet another method uses a parallel architecture to achieve temporal isolation of the key. And yet another method uses countermeasures to hide leakage information by utilizing idle reconfigurable processing elements to do dummy operations.

These known countermeasures against simple power analysis (SPA), differential power analysis (DPA) and correlation power analysis (CPA) can be classified into several categories including algorithmic countermeasures that mask or shuffle security-critical processes of cryptographic operators and hardware countermeasures that inject noise, incorporate non-deterministic processors and/or side-channel resistant logic styles. Countermeasures are typically evaluated based on the number of samples (plaintexts) required to successfully extract the key.

What is needed are methods designed to make differential power analysis (DPA) and correlation power analysis (CPA), as well as Electromagnetic analysis (EMA) techniques, ineffective as an attack vector. DPA and CPA are particular problematic because 1) they enable high resolution visibility into the gate-level switching behavior of the chip, 2) they are semi-invasive and non-destructive, requiring only bench-top test and measurement equipment (that are widely available and decreasing in cost), and 3) with additional time and processing, they have been shown to be successful even when circuit level countermeasures are employed.

BRIEF SUMMARY OF THE INVENTION

The present invention is directed to countermeasures to side-channel-based attack mechanisms. In particular, a dynamic partial reconfiguration (DPR) method for FPGAs makes techniques such as differential power analysis (DPA) difficult and/or ineffective. The technique according to the invention—referred to as "SPREAD" (Side-channel Power Resistance for Encryption Algorithms using DPR)—introduces diversity, and uncertainty, in the analysis of power supply transient signals.

According to the invention, the implementation characteristics of components or sub-components of an encryption algorithm are frequently changed (while preserving the functionality) using DPR methods. With DPA deriving its power by averaging power transient signals measured from an underlying invariant circuit implementation, small components of the circuit implementation are changed.

The invention is discussed in reference to the Advanced Encryption Standard (AES) algorithm, but any encryption algorithm is contemplated that uses replicated components or sub-components such as the Data Encryption Standard (DES), RSA encryption, and elliptical curve cryptography (ECC), to name a few. Components or sub-components include for example, SBOX, SubBytes, ShiftRows, MixColumns, AddRoundKey, and more particularly registers that store ciphertext and XOR gates. Replicated components or sub-components are those that perform identical functions and run simultaneously in parallel.

One or more redundant locations are added that can be re-programmed over time while in progress, i.e., on the fly. According to an embodiment of the invention, one additional reconfiguration location is added to the architecture to allow one or more components or sub-components to be disconnected from the encryption engine and reconfigured. This allows the encryption engine to continue to encrypt/decrypt at full speed without needing to stall and wait for reconfiguration to complete.

The architecture is attractive in that it may add only one 'redundant' component or sub-component and is therefore low in area overhead. However, more than one 'redundant' component or sub-component is contemplated. As an example, the invention may be directed to an architecture where each SBOX location has a redundant copy (increasing area overhead from 1 SBOX to 16 SBOXs), and one or multiple dynamic partial reconfiguration (DPR) operations are carried out in parallel, which reduces the correlation of key-related information in the power traces more dramatically.

According to an embodiment of the invention, one or more of the SBOX instantiations of the AES algorithm can be changed randomly and rapidly while encryption/decryption is being carried out using DPR. Specifically, replicated primitives within AES, in particular, the SBOX, are synthesized to multiple implementations. During encryption/decryption, SBOX components are randomly selected and replaced dynamically with one of these implementations. The implementations are stored within FPGA Block RAM resources (or secure processor side memory) and a DPR Controller state machine coordinates with AES to carry out periodic DPR. The DPR Controller state machine runs in parallel with the cryptographic primitive to synchronize with AES to enable periodic reconfiguration. The diversity of the implementations changes their delay characteristics and removes correlations in the power transients, making it difficult to identify the correct key.

To make differential power analysis (DPA) and correlation power analysis (CPA), as well as Electromagnetic analysis (EMA) techniques, ineffective as an attack vector, the present invention leverages the dynamic partial reconfiguration (DPR) capabilities available in modern FPGA-based system-on-chip hardware platforms. Reconfigurable hardware is increasingly being integrated into microprocessor environments and therefore, the opportunity to leverage DPR is expanding. The invention involves rapidly changing the implementation characteristics of components or subcomponents of encryption algorithm (while preserving the functionality) using DPR methods as a means of reducing correlations that are leveraged to deduce the top key byte candidates in cryptographic algorithms.

The invention is directed to several embodiments for creating the different instantiations, including methods which add 'wire stubs' to a fixed implementation as a means of changing its load capacitance and corresponding delay and power trace behavior. It is also contemplated that implementation diversity can also be introduced by making small inconsequential changes to the behavioral description and/or timing constraints of, e.g., an SBOX component, and then using the FPGA synthesis tools to add diversity automatically.

A set of instantiations are created which produce slightly different power transient signatures and then to swap the different instantiations in and out during cryptographic operations. DPA/CPA techniques, oblivious to the swapping, then average power traces from different instantiations. The mixed set of power traces create random artifacts in the averaged traces, reducing or eliminating correlations that allow the target key byte to be properly deduced. The state machine manages the swapping process and is designed to minimize stalls to the encryption engine which is running in parallel with SPREAD.

In addition to the diversity of implementations as a countermeasure to DPA/CPA, we also conduct a power analysis on the power signature that is generated by the DPR operation itself. It is important that the adversary is not able to track the SBOX configurations over time as swapping operations are carried out otherwise the traces corresponding to one particular configuration in the attack may be able to be separated. The DPR traces are very similar across two different implementations, as expected since the partial bitstream used to re-program the SBOXs are identical in size and only a subset of the configuration bits are different.

Moreover, the number of configurations is exponential and introduce a nonce-driven (random) timing interval between swapping operations, which, when taken together, make SBOX tracking by the adversary unlikely to be successful. Last, by implementing the SPREAD controller in the programmable logic (PL) portion of an FPGA SoC, it is possible to maximize swap frequencies, minimize power leakage and harden SPREAD against attacks designed to disable it.

The invention and its attributes and advantages will be further understood and appreciated with reference to the accompanying drawings.

BRIEF DESCRIPTION OF THE FIGURES

The preferred embodiments of the invention are described in conjunction with the appended drawings provided to illustrate and not to the limit the invention.

DETAILED DESCRIPTION OF THE INVENTION

The invention is directed to countermeasures to side-channel-based attack mechanisms. A dynamic partial reconfiguration (DPR) method for FPGAs makes techniques such as differential power analysis (DPA) difficult and/or ineffective by frequently changing (while preserving the functionality) the implementation characteristics of components or sub-components of an encryption algorithm. This is performed by replicating components or sub-components that perform identical functions and run simultaneously in parallel. This allows the encryption engine to continue to encrypt/decrypt at full speed without needing to stall and wait for reconfiguration to complete. With DPA deriving its power by averaging power transient signals measured from an underlying invariant circuit implementation, small components of the circuit implementation are changed. Side-channel Power Resistance for Encryption Algorithms using DPR (SPREAD) introduces diversity, and uncertainty, in the analysis of power supply transient signals.

One or more redundant locations are added that can be re-programmed over time while in progress, i.e., on the fly. According to an embodiment of the invention, one additional reconfiguration location is added to the architecture to allow one or more components or sub-components (SBOX, SubBytes, ShiftRows, MixColumns, AddRoundKey, registers, XOR gates) to be disconnected from the encryption engine and reconfigured.

Although the invention is discussed in reference to the Advanced Encryption Standard (AES) algorithm, any encryption algorithm is contemplated that uses replicated components or sub-components such as the Data Encryption Standard (DES), RSA encryption, and elliptical curve cryptography (ECC), to name a few. The implementation characteristics of components or sub-components of an encryption algorithm are frequently changed while preserving the functionality using DPR methods.

According to one contemplated embodiment, replicated primitives within AES, such as the SBOX, are synthesized to multiple implementations. During encryption/decryption, SBOX components are randomly selected and replaced dynamically with one of these implementations. The implementations are stored within FPGA Block RAM resources and a state machine coordinates with AES to carry out periodic DPR. The diversity of the implementations changes their delay characteristics and removes correlations in the power transients, making it difficult to identify the correct key.

A controller according to the invention is a VHDL module that coordinates the DPR operations with a fully operational encryption engine, e.g., advanced encryption standard (AES). The system and methods according to the invention performs self-reconfiguration using Xilinx's internal configuration access port (ICAP) interface. Self-reconfiguration refers to techniques that run in the programmable logic (PL) that reconfigure other components in the PL, excluding itself.

Figure 1:
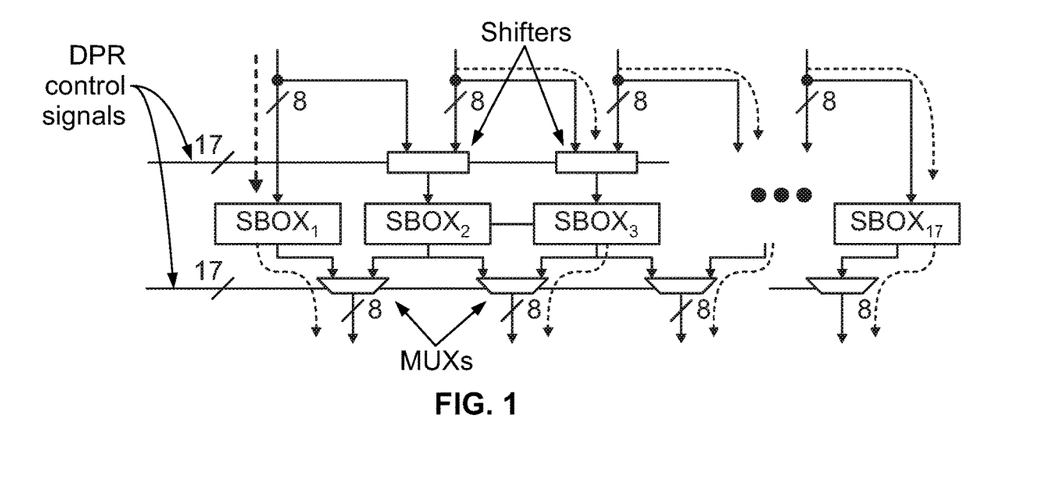
FIG. 1 illustrates a single-unit redundancy scheme according to an embodiment of the invention.

The time taken to perform DPR using the ICAP inter face is approximately 1 ms for smaller partial dynamic reconfigurable regions, referred to herein as "pblocks". Therefore, stopping cryptographic operations to carry out DPR would introduce a significant performance penalty on the encryption or decryption operations. To address this issue, a single-unit redundancy scheme is implemented as shown in FIG. 1 using AES as the encryption engine. Each of the SBOX regions is reconfigurable. Although FIG. 1 illustrates a subset of SBOXs, it should be noted that a set of 16 parallel SBOXs are needed in the 128-bit version of AES.

The invention adds one additional parallel SBOX. The DPR control signals from the controller are used to create a 'hole' in the parallel configuration of the 17 SBOXs, by using shifters and MUXs to wire around the SBOX that is the target for reconfiguration. FIG. 1 shows the routing configuration when $SBOX_2$ is the target. Since DPR can take place while the rest of the system continues to operate at full speed, encryption/decryption can continue with only 1 stall cycle to reconfigure the shifters and MUXs.

Figure 2:
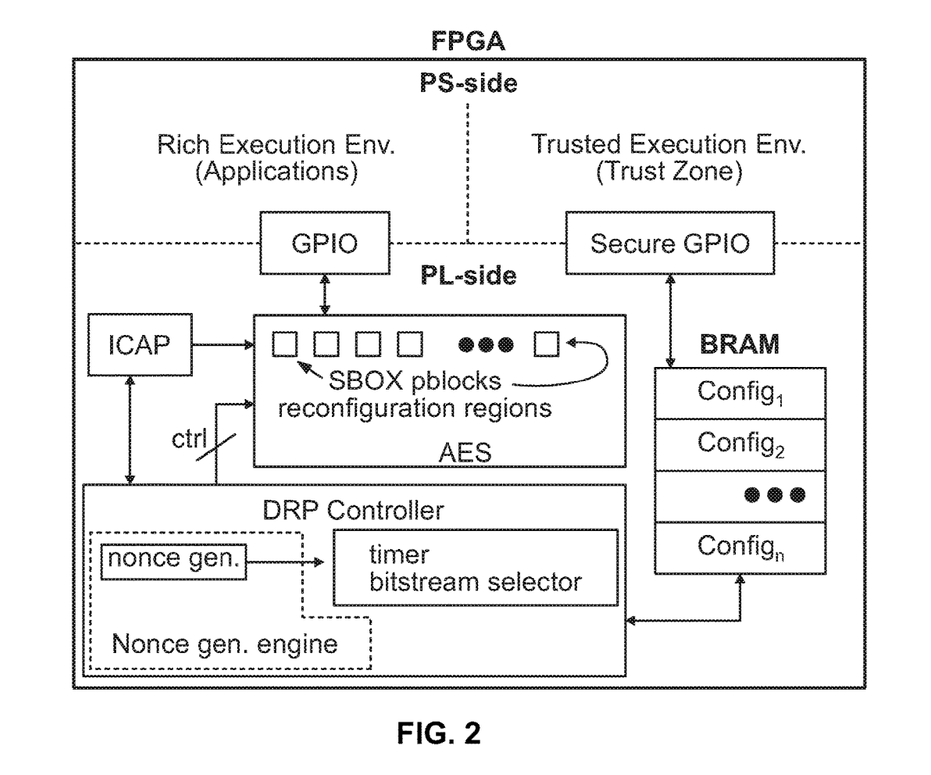
FIG. 2 illustrates a block diagram of a system that is applicable to FPGA SoC ("field-programmable gate array system on a chip") architectures.

A block diagram of the proposed system that is applicable to FPGA SoC architectures is shown in FIG. 2. Security features that exist on the Processor Side of the SoC, such as Xilinx TrustZone, can be leveraged to ensure the partial bit-streams are loaded into BRAM using a secure general-purpose I/O (GPIO) interface. Once loaded, at least two operations are carried out by the DPR Controller during encryption or decryption.

First, the nonce generation engine is started (described more fully below). The nonces are used to randomize the time intervals between DRP operations, select from among the configurations that have been loaded into the BRAM, and select the target reconfigurable regions within the cryptographic engine.

The second operation is to read the selected bitstream from BRAM, assert the appropriate control signals for reconfiguration of the selected cryptographic component, synchronize with the cryptographic engine to insert one or more stall cycles as needed, and execute the transfer protocol using the ICAP controller.

The frequency of reconfiguration is bounded by energy consumption overhead on one hand and the requirement to keep the number of power traces that can be collected under any one configuration to a small number on the other. Based on the results (presented below) that are directed to applying DPA to an AES implementation on an FPGA, the time required to collect a sufficient number of waveforms (factoring in O-scope averaging time) is measured in hours at best of data collection. DPR carried out using AES SBOX takes approximately 1 ms, which upper bounds the frequency of reconfiguration to approximately 1000/second. Hence reconfigurations can be done at a relatively slow and random frequency, from several per second to one every couple seconds. The power consumed by DPR for a region large enough to contain the SBOX is in the 10's of microWatt range, so battery operated devices may opt for slower frequencies of reconfiguration.

As presented above, a set of AES SBOX implementations are stored within FPGA BRAM resources. The implementations are created by introducing modifications to the place and route characteristics of the AES SBOX. These changes to the structural (not functional) characteristics of SBOX introduce small changes in the path delays and corresponding power trace information. The success of waveform averaging carried out in a DPA attack is critically dependent on the delay behavior of individual gates (and entire paths) remaining invariant. By changing the wiring and LUTs used by a specific implementation of SBOX over time, waveform averaging carried out across different implementations reduce the accumulated power information generated by the SBOX output bit under attack. Moreover, power peaks associated with SBOX output bits that are not targeted increase in magnitude because averaging is less effective in reducing their amplitudes to near zero, as required by the DPA algorithm.

On the other hand, it is also important that the power trace distortion introduced by different implementations be small enough to make it difficult or impossible for an adversary to determine which of the implementations is currently 'installed' into the AES engine. The difficulty of tracking replacements is compounded by the large number of possible fully instantiated AES configurations, ($16^{NI}$, with NI defined as the number of different implementations). Given the power trace represents the superposition of power traces from all 16 simultaneously executing SBOXs, this task is likely intractable for the adversary. The most significant vulnerability is the possibility of tracking replacements using the DPR power trace, which is addressed below.

Implementation diversity techniques that introduce changes to the structure of SBOX can be done in several different ways. A first embodiment involves adding wire loads (stubs) to the existing wires in the 'implemented' view of the design. FPGA vendors provide interfaces that allow manipulation of the individual routes using, for example, the "Implemented Design View" in the Xilinx Vivado CAD tool. This strategy of manipulating wire loads introduces only small changes to the delay of the targeted paths. Another embodiment involves making a small, inconsequential change to the VHDL description of the SBOX and then re-synthesizing it. This strategy tends to create larger differences in the path delays from one implementation to the next. The delay using both of these strategies is now discussed.

Figure 3:
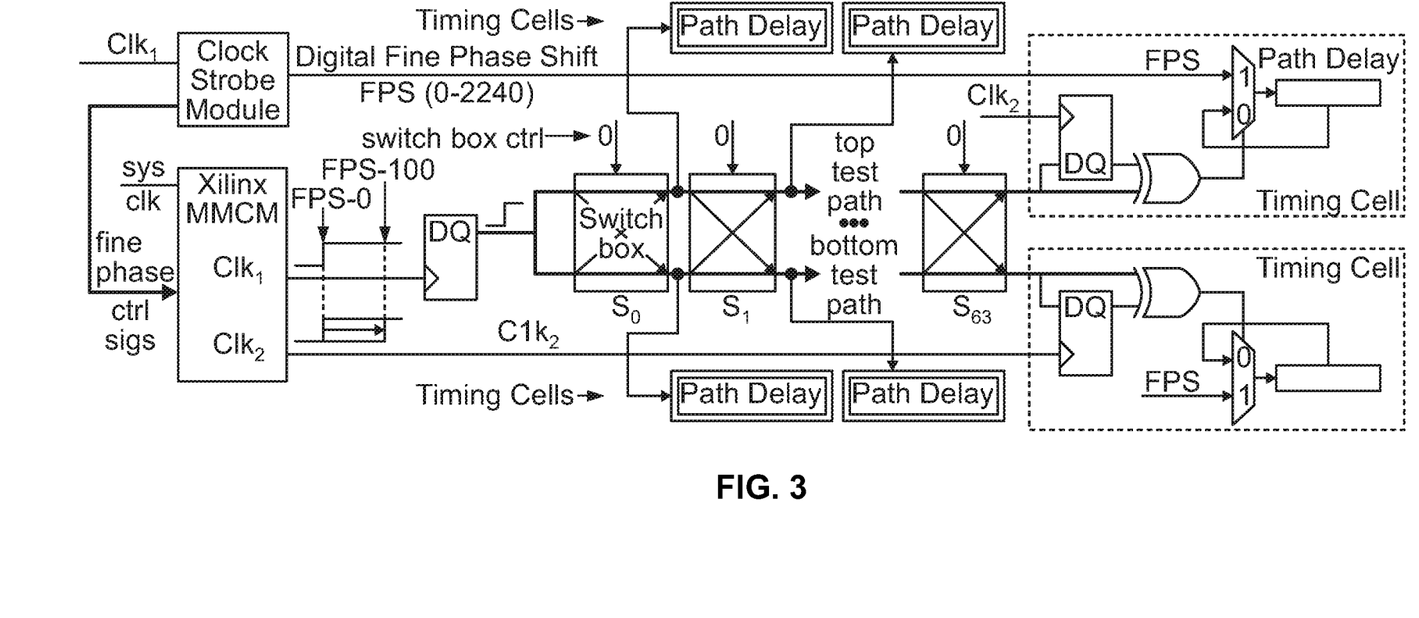
FIG. 3 illustrates a block diagram of the test structure used to evaluate 'wire stub' effect on path delays.

Although the simulation tools can be used to estimate the delay impact of these wire-load and synthesis-directed diversity strategies, the impact is measured directly in hardware experiments carried out on an FPGA. A block-level diagram of the test structure used in our experiments is shown in FIG. 3. Path delay measurements can be measured with high accuracy, i.e., in the range of approximately 30 ps, using the 'Fine Phase Shift' feature of the digital clock manager (called multi-mode-clock-manager or MMCM in Xilinx architectures), and a clock strobing technique. The Clock Strobe Module (CSM) and MMCM are shown on the left side of FIG. 3. The CSM is implemented as a VHDL module and is the controlling module. It issues control signals to the MMCM to adjust the fine phase shift (FPS) between $Clk_1$ and $Clk_2$ and includes an up-counter to keep track of how many FPS have been applied. The initial phase shift is 0 and is incremented until all path segments in the test circuit have been timed. Each increment adjusts the FPS forward by 18 ps.

The test circuit implements a sequence of 64 'Switch boxes', which allow the two incoming signals to be routed straight through the switch box (with switch box ctrl set to 0) or flipped (set to 1). A pair of 'Timing Cells' are added to the output of each Switch box, as shown on the right side of FIG. 3. Each Timing Cell includes a flip-flop (FF) driven with the fine phase shifted clock $Clk_2$, an XOR gate, a 2-to-1 MUX and an "n-bit" register (labeled Path Delay). This Timing Cell circuit is replicated at each pair of Switch box outputs.

The FFs of all Timing Cells are initialized with the initial value of the Switch Box output signals, which is 0 when a rising edge signal is to be timed. The CSM then performs a sequence of 'launch-capture' tests, with $Clk_2$ phase shifted forward by 18 ps before each test. The XOR gates in the Timing Cells produce a 1 at the beginning of the sequence because the test path signals captured in the FFs remain at the initial value, i.e., the signal propagating along the test path has not had enough time to reach the FF inputs before $Clk_2$ is asserted. This causes the current value of the digital Fine Phase Shift (FPS) produced by the CSM to be stored in the Path Delay registers.

As the FPS count increases in the sequence of tests, the signals propagating at the beginning of the test path begin to reach the FF inputs before $Clk_2$ is asserted. The CSM stops updates to the Path Delay register for these Timing Cells when this occurs. The final value stored in the Path Delay registers of the Timing Cell is the value of FPS counter. The count is an integer value that can be converted into an actual delay by multiplying it by 18 ps, i.e., the step size associated with consecutive FPS values.

Figure 4:
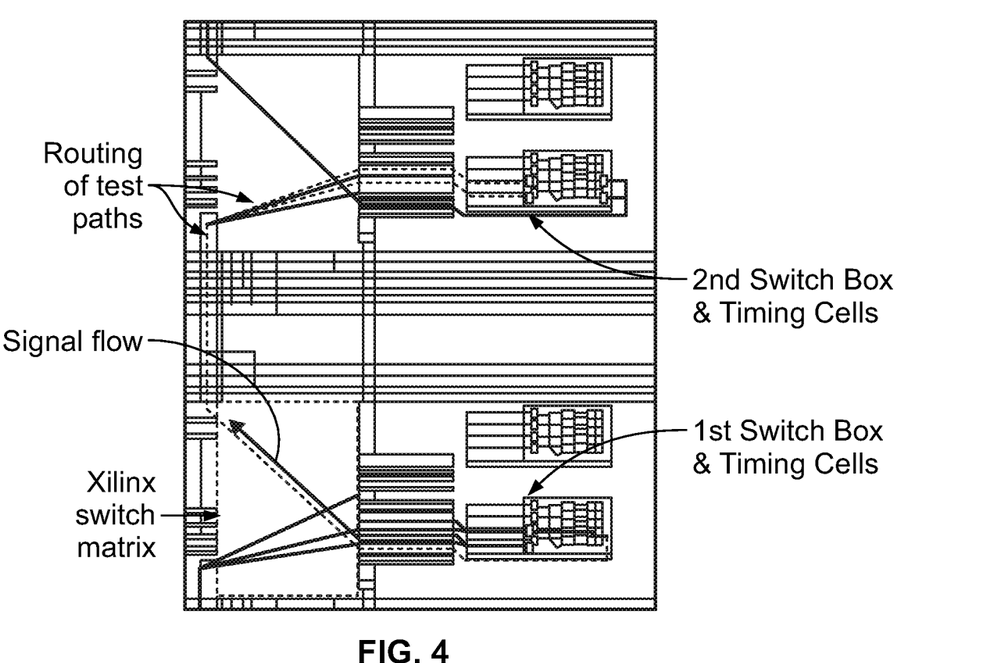
FIG. 4 illustrates a screenshot view of two consecutive switch boxes & timing tells (top-to-bottom) from the block diagram illustrated in FIG. 3.
Figure 5:
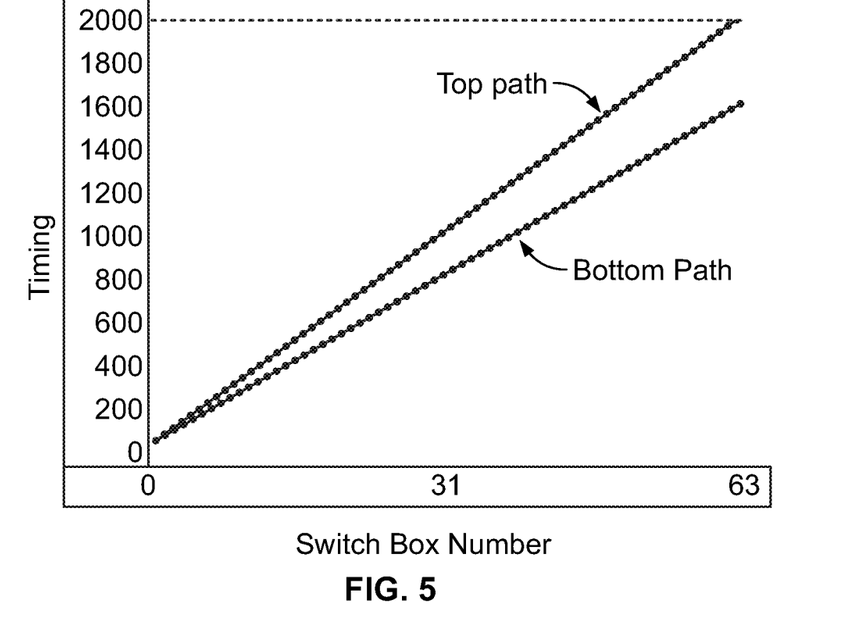
FIG. 5 illustrates a plot of timing values from path delays of test paths stored in the timing cell after the clock strobe operation completes.

The wire-load diversity model is analyzed. FIG. 4 shows a screen snapshot of two consecutive Switch boxes & Timing Cells (top-to-bottom) from the block diagram of FIG. 3. The Switch boxes and Timing Cells are implemented in the LUTs as shown on the right side. The two test paths between each pair of Switch boxes are routed manually. One of the routes is highlighted in a white dashed line, while the second one is adjacent to it in a white solid line. The routes are configured using a sequence of Xilinx switch boxes as shown on the left. The switch boxes allow an incoming signal to be routed to one or more of "n" output-going routes. Although only 1 outgoing route is used in this example, any number of routs is contemplated. The wire-load implementation diversity strategy uses these switch boxes to add wire loads to existing routes within an SBOX as a mechanism to change the delay of paths. The test structure in FIG. 3 is used to measure the change in delay under different wire-load models using a Zynq 7020 FPGA. The plot in FIG. 5 shows the set of timing values for the two test paths obtained from the 64 Path Delay registers after the clock strobing operation completes. The digital timing values vary from approximately 65 to 2050. As mentioned, each increment of FPS adds approximately 18 ps to the overall delay so the actual delays of the increasingly longer path segments vary from 1.161 ns to 36.613 ns. These delays define the 'base case', i.e., the circuit configuration in which no wire loads have been added.

Figure 6A:
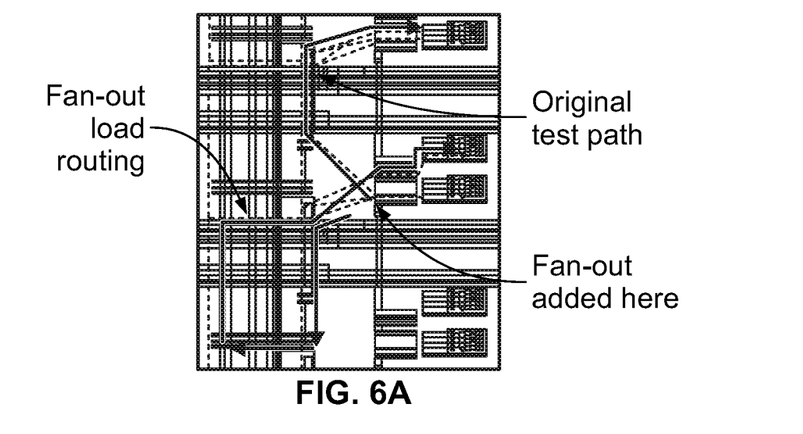
FIG. 6a illustrates a screenshot view of a wire load configuration with a fan-out added to a lower switch.
Figure 6B:
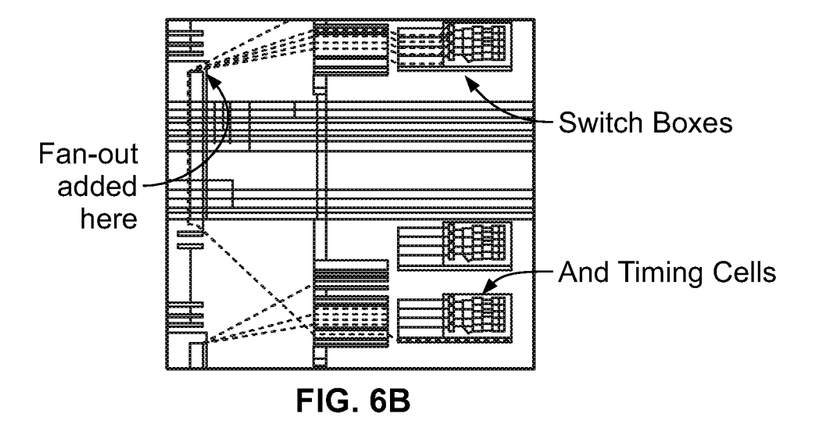
FIG. 6b illustrates a screenshot view of a wire load configuration with a fan-out added to an upper switch.
Figure 6C:
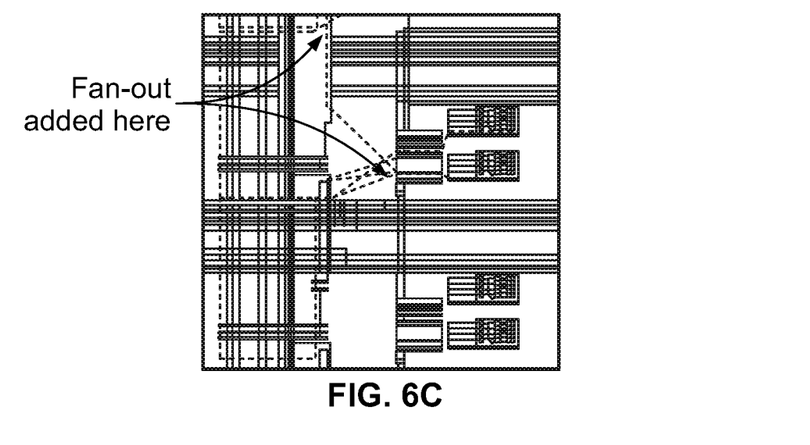
FIG. 6c illustrates a screenshot view of a wire load configuration with both a fan-out added to a lower switch and a fan-out added to an upper switch.
Figure 7:
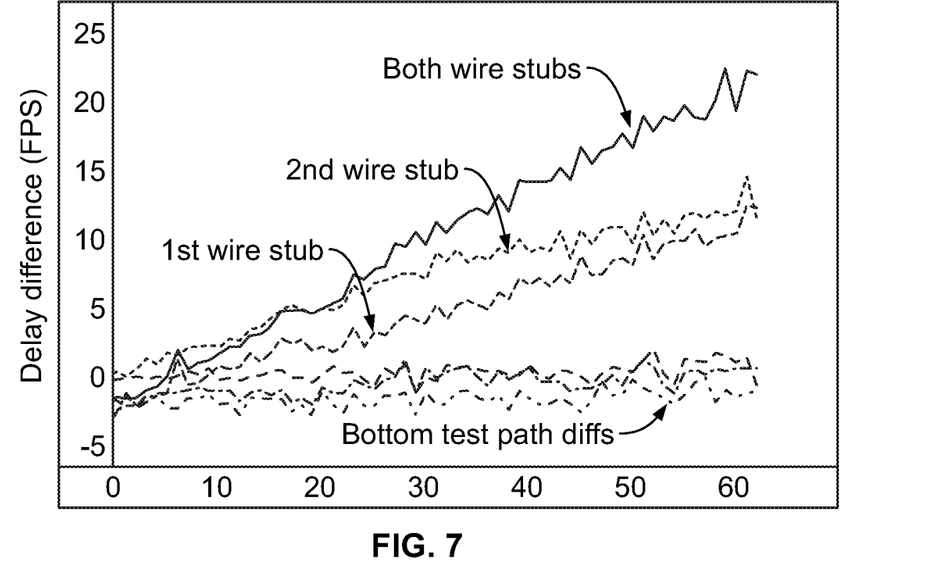
FIG. 7 illustrates a plot of difference in test path delays under the three wire load configurations of FIGS. 6a-6c.

In contrast, FIGS. 6A, 6B, 6C shows three test cases with wire stub loads added to the top test path only between two Switch boxes. FIG. 6A shows fan-out added to the lower switch box, FIG. 6B shows it added to the upper switch box and FIG. 6C shows a configuration that adds fan-out to both locations. The impact on delay that each fan-out load introduces is small. In order to measure it accurately, the switch boxes are configured along the entire top test path using each of these wire stub load models and then measured the difference in delay at each Switch box using the Timing cells. FIG. 7 plots the difference in units of FPS. As shown in FIG. 7, the differences in path delay for the 1st and 2nd scenarios is approximately 2.8 ps per stage. This is computed using the cumulative value of 10 at stage 64, multiplying by 17.86 ps and dividing by 64 stages. The delay using both wire loads is approximately double as expected. This analysis indicates that the wire-load mechanism for changing delays provides very fine control over the obfuscation process. This strategy can be used alone or in combination with a second strategy referred to as synthesis-directed diversity.

The synthesis-directed diversity model is analyzed. Synthesis-directed diversity refers to the different implementations that the FPGA (and ASIC) synthesis tools can generate from the same behavioral description. Synthesis-directed diversity can be implemented in two ways. The first is to make small (inconsequential) changes to the HDL behavioral description and then simply re-synthesize the implementation. The heuristic algorithms used within the synthesis tools are not able to find optimal solutions to, e.g., the place and route problem. Therefore, the implemented designs typically introduce larger differences in path delays from one implementation to the next (when compared with the wire-load strategy). The diversity of this approach is evaluated below.

A second method is to synthesize using different versions of a standard cell library. Standard cell libraries are used in ASIC flows, e.g., Cadence RTL compiler, to convert a behavioral description of a design into a structural netlist. By changing the logic cells available within a set of standard cell libraries, the synthesis tool is forced to implement the design using different logic gates, which will have a subsequent impact on the path delays of each implementation (and the power trace behavior). This strategy can also be used in FPGA flows by using ASIC-generated netlists as the input description of a design instead of behavioral HDL.

The DPR strategies according to the invention depend heavily on the adversary not being able to track which of the multiple implementations of the AES SBOX are used in the DPR operation. It may be difficult for the adversary to accomplish this for several reasons. First, the set of partial bitstreams used to implement the SBOX are the same size and are otherwise identical except for a subset of the configuration bits. Second, SPREAD is implemented as an HDL module and runs entirely within the PL side of the FPGA.

Figure 8:
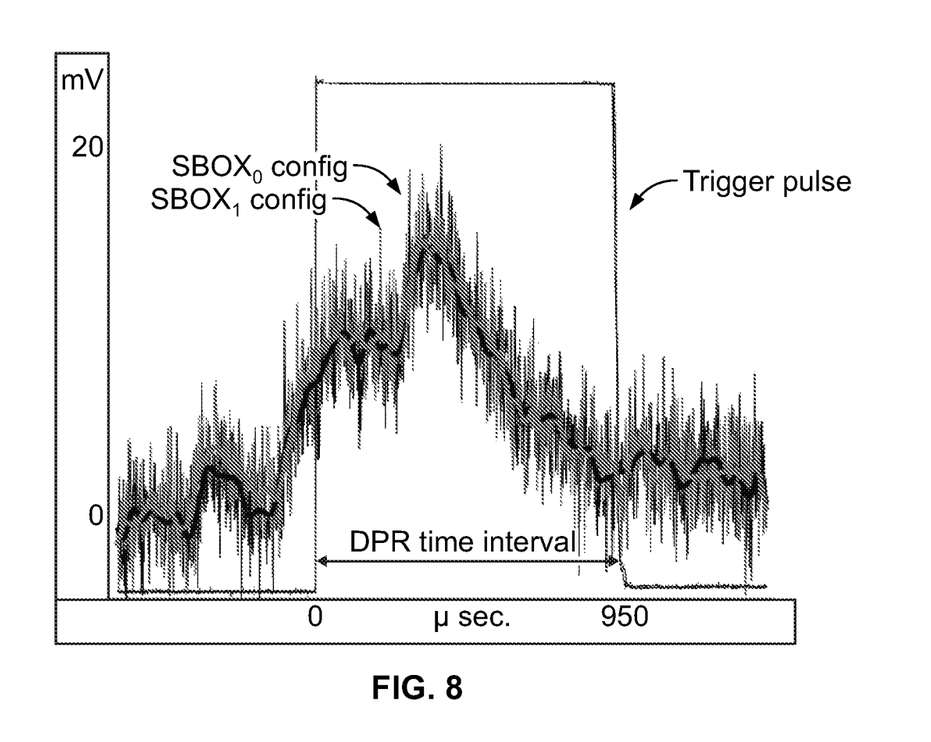
FIG. 8 illustrates the power traces measured using a digital oscilloscope for two SBOX configurations, $SBOX_0$ and $SBOX_1$, during dynamic partial reconfiguration.

The DPR power traces are analyzed by creating two instantiations of the AES SBOX, $SBOX_1$ and $SBOX_2$, using the synthesis-directed diversity strategy described above. The power traces are measured when each is used as the source in a DPR operation. The size of the AES SBOX partial bitstreams are approximately 58 KB. FIG. 8 shows the power traces measured using a Tektronix 7254 digital oscilloscope. The region within the triggering pulse box corresponds to the time period associated with the DPR operation. According to this investigation, DPR using a C program running under Linux on the Zynq 7020 SoC was implemented.

The two versions of the SBOX are reconfigured into the same region on the FPGA. The power traces are averaged 100 times to reduce noise and is noise-filtered using a software 'smoothing' routine to remove the high frequency noise. Small distinguishing features are evident in the 'smoothed' waveforms, which are shown in FIG. 8 as thick lines through the averaged (but still noisy) oscilloscope waveforms.

DPA experiments are performed to evaluate critical security properties. Particularly, only one SBOX is included in the model tested. And two versions of the model are created using the synthesis-directed diversity technique.

Figure 9:
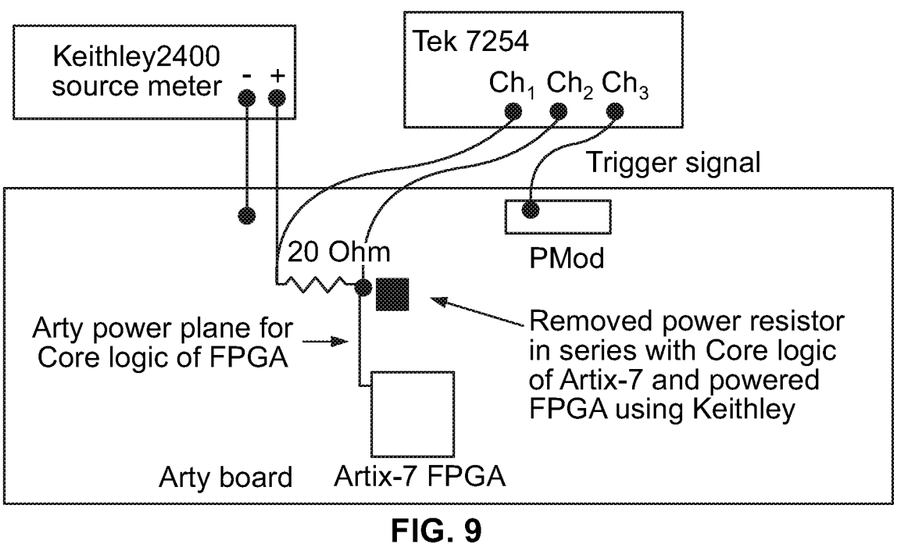
FIG. 9 illustrates a block diagram of a circuit according to an embodiment of the invention.

FIG. 9 illustrates a block diagram of a circuit according to an embodiment of the invention. A Xilinx Artix-7 XC7A35T FPGA is used as the hardware platform for the DPA experiments. All of the decoupling capacitors are removed from the Artix-7 ("Arty") board as a mechanism allow the higher frequency components of the PL-side switching activity to be measured across a 20 Ohm resistor placed in series with the core power supply. Two active TAP3500 probes are placed across the 20 Ohm resistor and the scope is configured to measure differentially across the resistor.

One thousand samples of the differential signal for each of the 1400 applied plaintexts are averaged. This is necessary to average out the large asynchronous noise transient produced by the voltage regulator installed on Arty. The same experiment was carried out on the two implementations of the SBOX, referred to as $V_1$ and $V_2$.

Figure 10:
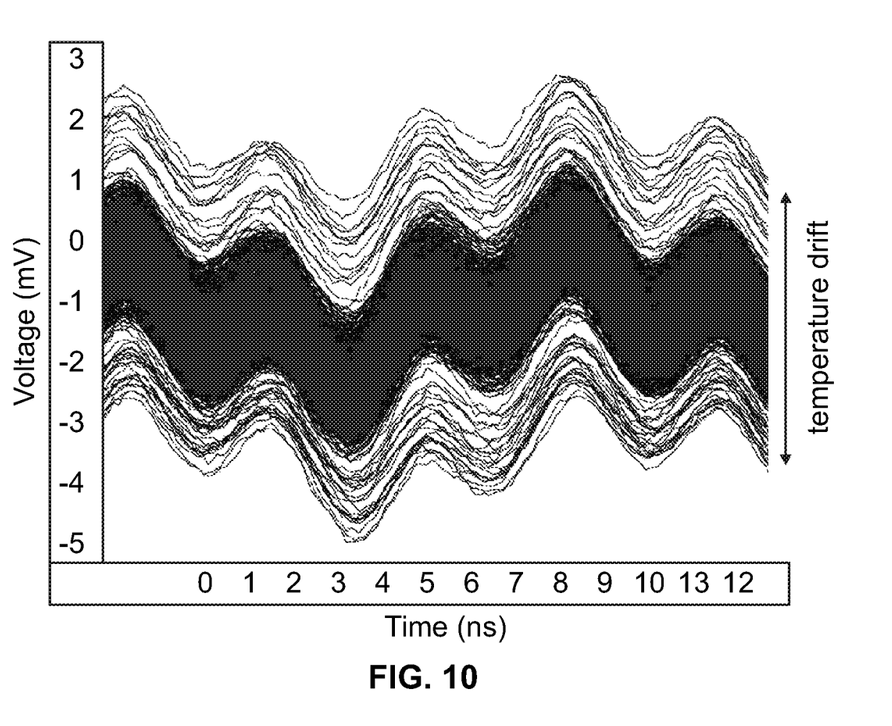
FIG. 10 illustrates a plot of averaged differential power traces from a configuration ($V_1$) used in the DPA algorithm according to an embodiment of the invention.

A differential power analysis process is applied to the 1400 power traces measured for the plaintexts in each experiment separately. The power traces measured from the $V_1$ experiment are shown in FIG. 10. The majority of vertical dispersion in the waveforms is caused by small changes in room temperature. The Artix-7 chip has a large DC leakage current of approximately 27 mA that is extremely sensitive to the temperature. The change in leakage for variations of a couple degrees in room temperature is approximately 200-300 microamps that is then amplified across the 20 Ohm resistor as shown. Given this sensitivity, DPA experiments are best carried out inside a temperature chamber. The vertical drift reduces the level of correlations in the waveform differences created by the DPA procedure, discussed further below.

Figure 11:
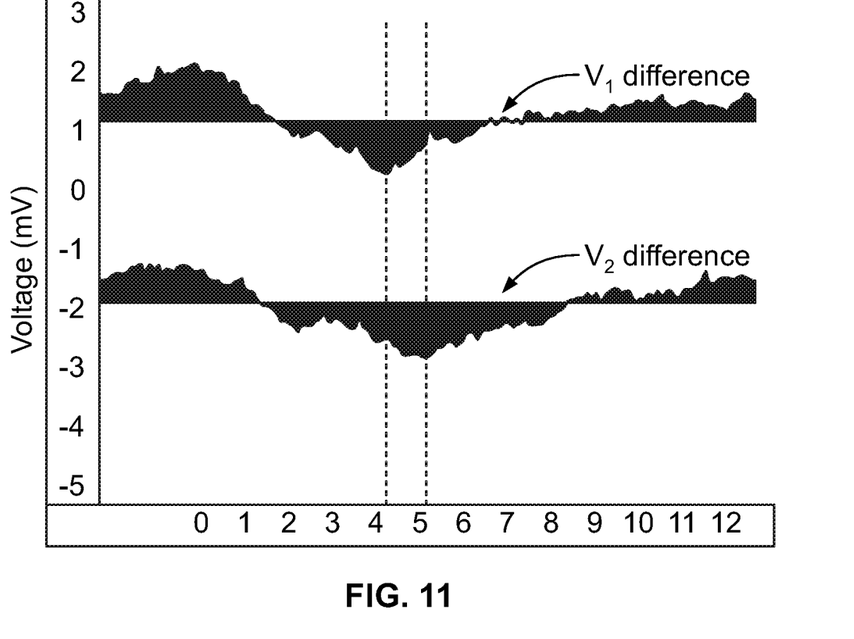
FIG. 11 illustrates a plot of differential power traces for correct key guesses for two implementations ($V_1$ and $V_2$) according to an embodiment of the invention.

The high order bit of the SBOX is used to partition the 1400 power traces into two groups for each of the 256 key guesses and an average power trace from each group of approximately 700 power traces is computed. The difference power traces for the correct key guess for $V_1$ and $V_2$ are shown in FIG. 11. The vertical dotted lines illustrate that the correlation peak has shifted to the right for $V_2$ from approximately 4.2 ns for $V_1$ to 5.1 ns for $V_2$. This reflects the change in delays to bit 7 in each of the two implementations of SBOX.

Figure 12:
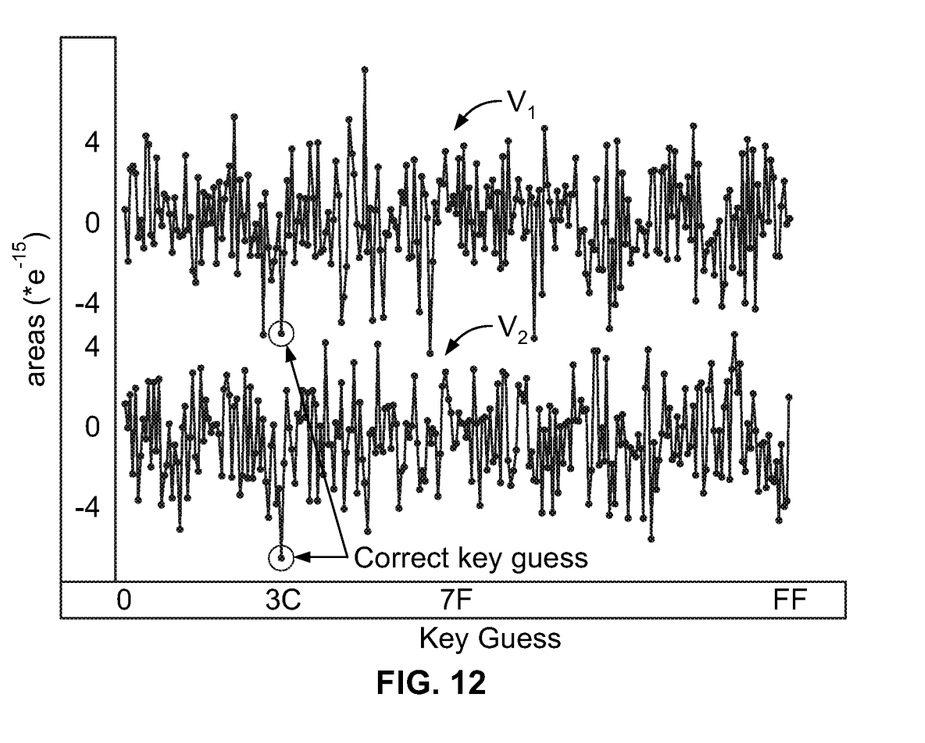
FIG. 12 illustrates a plot of areas of peaks for two implementations ($V_1$ and $V_2$) according to an embodiment of the invention.

A small region around the peak values of 200 ps is integrated for each of the key guess from 0 to 255 and plotted in FIG. 12. The negative peak for the correct key guess of 3C is highlighted. The area is expected to be negative because the 1 group is subtracted from the 0 group, and the 1 group represents those plaintexts that cause bit 7 to transition to 1. A transition to 1 draws current from the power rail creating a larger voltage drop than the 0 group. As shown, the correct key guess ranks 4th as the largest negative peak for $V_1$ and 1st for $V_2$. As indicated above, the vertical drift in the raw power traces reduces the correlation. Despite this issue, the correlation associated with the correct key guess is still evident.

Figure 13:
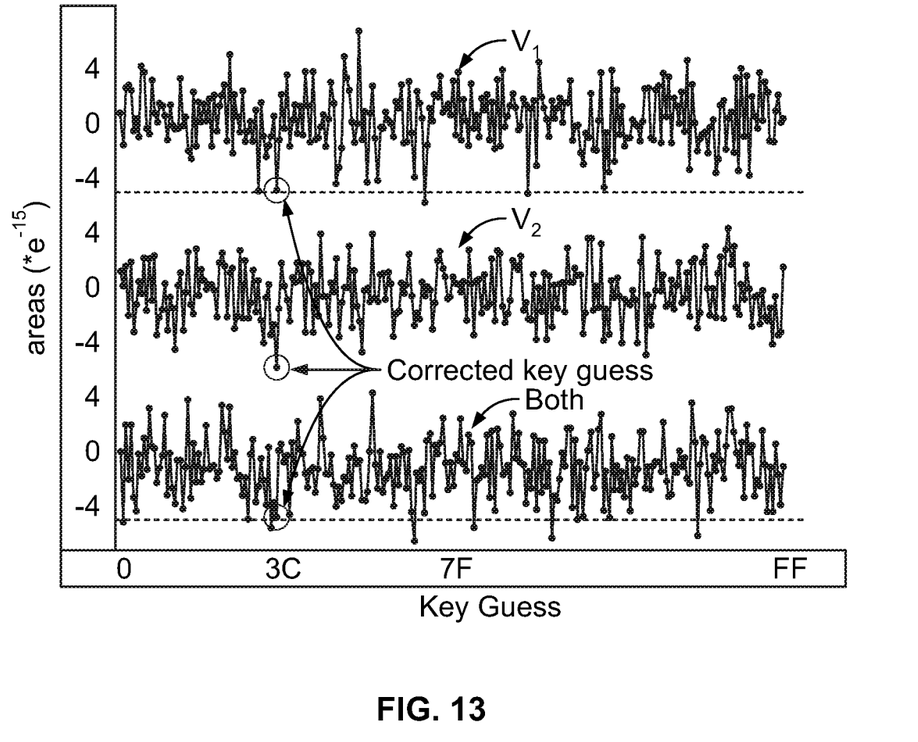
FIG. 13 illustrates a plot of areas of peaks for two implementations ($V_1$ and $V_2$) and a mixture of both according to an embodiment of the invention.

The results shown in FIG. 13 include an analysis labeled 'Both' in which half the power traces from $V_1$ and $V_2$ are combined. This mixing of the power traces represents a simplified scenario where the two implementations of the SBOX are swapped in and out by SPREAD during encryption. As shown, the peaks in the bottom graph ("Both") associated with the key guesses have now changed height. More importantly, the peak height associated with the correct key guess of 3C now ranks 9th in the list of largest negative peaks. It is contemplated that the when the number of implementations is greater than 2, the reduction in correlation is likely to be even larger.

These FPGA experiments evaluate key elements of the SPREAD technique. The analysis of delay is presented for an implementation diversity strategy in which wire stubs are added to existing wires. A second synthesis-directed implementation diversity strategy is evaluated using DPA experiments. The results demonstrate that correlations in the power traces are reduced.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A method for a countermeasure to a side-channel attack to a computer system, the method comprising steps of:
  performing by a field programmable gate array (FPGA) dynamic partial reconfiguration (DPR) to remove a correlation in power transient signals of an encryption algorithm implemented on an encryption hardware engine, the encryption hardware engine including one or more redundant locations, wherein the encryption algorithm embeds a randomization component of the encryption hardware engine that changes constantly implementation characteristics of one or more hardware components or hardware sub-components of the encryption hardware engine by disconnecting the one or more hardware components or hardware sub-components from the encryption hardware engine within the FPGA using the one or more redundant locations producing replicated components, wherein the replicated components change a corresponding path delay that changes behavior of a corresponding power trace of the FPGA to provide the countermeasure to the side-channel attack which introduces diversity and uncertainty to the power transient signals, wherein the one or more redundant locations allow the encryption hardware engine to run without stalls while DPR is performed on the one or more redundant locations disconnected from the FPGA, and running the one or more hardware components or the hardware sub-components simultaneously and in parallel with the replicated components.

2. The method according to claim 1, wherein each redundant location is configured to be re-programmed over time.

3. The method according to claim 1, wherein the encryption hardware engine continues to execute encryption/decryption at full speed without stalling or waiting for the performing step to complete.

4. The method according to claim 1, wherein two or more of the hardware components or hardware sub-components perform identical functions.

5. The method according to claim 1, wherein the one or more hardware components or hardware sub-components is selected from the group: SBOX, SubBytes, ShiftRows, MixColumns, AddRoundKey, registers, XOR gates.

6. The method according to claim 1, wherein the encryption algorithm is an advanced encryption standard (AES).

7. The method according to claim 1, wherein the side-channel attack is a simple power analysis (SPA), differential power analysis (DPA), or correlation power analysis (CPA) counter-measure attack.

8. A method for performing by a field programmable gate array (FPGA) dynamic partial reconfiguration (DPR) for a countermeasure to a side-channel attack to a computer system, the method comprising steps of:

providing an encryption hardware engine comprising hardware components or hardware sub-components, one or more redundant locations, and an encryption algorithm, using the one or more redundant locations to disconnect from the encryption hardware engine within the FPGA one or more hardware components or hardware sub-components of the encryption hardware engine and randomly changing implementation characteristics of the one or more disconnected hardware components or disconnected hardware sub-components of the encryption hardware engine to produce replicated components, wherein the one or more redundant locations allow the encryption hardware engine to run without stalls while DPR is performed on the one or more redundant locations disconnected from the FPGA, running connected one or more hardware components or the connected hardware sub-components simultaneously and in parallel with the replicated components to change a behavior of the FPGA to provide the countermeasure to the side-channel attack to the computer system.

* * * * *